Aug. 16, 1966     C. H. HAVELKA     3,267,193

METHOD OF MAKING A WATER CONDITIONING TANK

Filed Feb. 25, 1963

Clarence H. Havelka
INVENTOR.

BY Ransseles O. Wyatt

ATTORNEY 3,267,193
METHOD OF MAKING A WATER CONDITIONING TANK
Clarence H. Havelka, 1416 W. Bell, Apt. 2, Houston, Tex.
Filed Feb. 25, 1963, Ser. No. 260,733
2 Claims. (Cl. 264—219)

This invention relates to new and useful improvements in a filter for water conditioners and method of manufacturing same.

It is an object of this invention to provide a method of making a filter for water conditioners that may be molded directly into the ion exchange tank and employed as a permanent filter.

It is another object of the invention to provide a method of making a filter for water conditioners formed of epoxy bound granulates, providing a porous filter of great durability and inert to the actions of the chemicals in the ion exchange bed or the water being filtered.

It is another object of the invention to provide a method of making an article of manufacture that may be easily manufactured, cheaply produced, and effective for preventing colloidal matter from entering the resin bed and preventing matter from the resin bed passing into the water discharge conduit.

Figure 1:
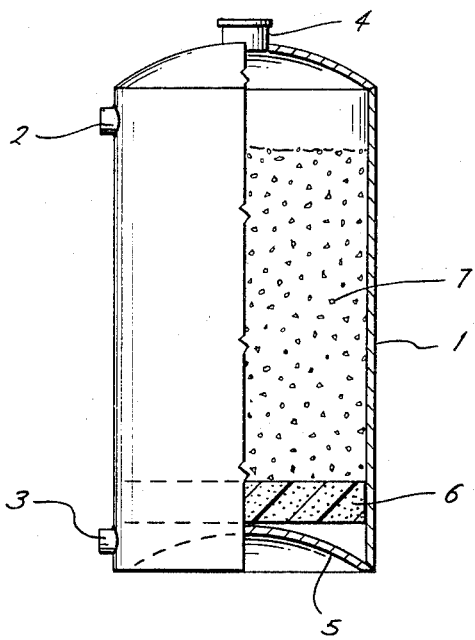
Figure 2:
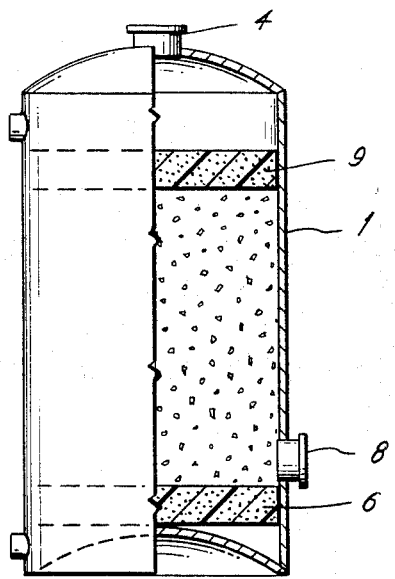
Figure 3:
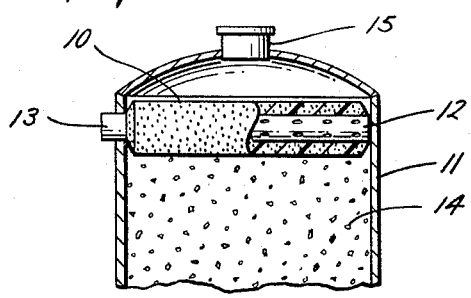

With the above and other objects in view, the invention has relation to certain novel features of construction, and operation, more particularly defined in the following specifications, and illustrated in the accompanying drawings, wherein:

FIGURE 1 is an elevational view of the ion exchange tank, partially in cross section, showing the use of one filter in the ion exchange tank, FIGURE 2 is an elevational view of an ion exchange tank, in cross section, showing the use of upper and lower filters, and FIGURE 3 is a fragmentary view of an ion exchange tank, in cross section, showing another form of filter employed.

Referring now more particularly to the drawings, the numeral 1 designates an ion exchange tank having the usual inlet conduit 2 and discharge conduit 3 and recharge inlet 4. The bottom 5 of the tank is convex, extending upwardly into the tank.

A lower filter 6 is formed in the tank 1 by placing sand in the tank 1 to fill the area around the upwardly extending bottom, leaving the peak of the bottom exposed, and a mixture of sand and activated epoxy resin, or a similar resin binder, is poured into the tank to the desired depth. When the mixture has set, the sand beneath the filter 6 is removed through the discharge opening 3, and the usual ion exchange bed 7 is formed above the filter 6. Before entering the discharge conduit 3, the water being treated will pass through the conduit 2 and through the ion exchange bed 7 and through the filter 6.

Where it is desired to remove granules, detritus or colloidal matter from the water prior to its entrance to the ion exchange bed, the tank shown in FIGURE 2 is employed, having an ion exchange discharge opening 8, and in this form, the lower filter is formed as above described, the ion exchange bed is formed above the lower filter and a top filter 9 is formed on top of the ion exchange bed immediately beneath the inlet conduit 2.

This arrangement permits filtering of the detritus or colloidal matter from the water before entering the ion exchange bed 7 and permits backwashing of the ion exchange bed without loss of particles from the resin bed forming the ion exchange bed during the backwashing action.

The ion exchange bed is recharged in the usual manner, as by inserting brine through the inlet 4. An alternate form of the filter herein contemplated is shown in FIGURE 3 wherein the top filter 10 is a tubular member in the upper end of the tank 11 and which consists of the perforated core member 12 in axial connection with the inlet conduit 13, and which is mounted transversely in the tank 11. The core 12 has the epoxy bound granulate mass molded therearound and through which the water passes from the inlet conduit into the ion exchange bed 14. When it is desired to backwash the ion exchange bed 14, the back flow will be through the ion exchange bed into the filter 10 and out through the opening 13. In the recharging operation, brine may be introduced into the ion exchange bed through the port 15 and washed out through the same backwash procedure, assuring retaining all of the particles of the ion exchange bed in the tank 11.

While the foregoing are considered preferred forms of the invention, they are by way of illustration only, the broad principle of the invention being defined by the appended claims.

What I claim is:

1. In the method of making a water conditioning tank, forming a tank having a convex bottom and an upper and lower conduit, partially filling the tank with loose sand to a level that will leave a portion of the convex bottom exposed, pouring a mixture of sand and activated epoxy resin into the tank to a preselected depth and removing the loose sand from the tank after the mixture of sand and epoxy resin has set.

2. In the method of making water conditioners, forming a loose sand bed in a water conditioning tank having a convex bottom, said loose sand being on a level with the peak of the said convex bottom, forming a filter by pouring a mixture of activated epoxy resin and granulate onto the loose sand bed to a preselected depth, removing the loose sand bed after the mixture of epoxy resin and granulate has set, building an ion exchange bed on said mixture and forming a second filter by pouring a mixture of activated epoxy resin and granulate onto the ion exchange bed.

References Cited by the Examiner

UNITED STATES PATENTS

| | | | |
|---|---|---|---|
| 1,750,879 | 3/1930 | De Markus et al. | 210—266 X |
| 2,751,347 | 6/1956 | Miller | 210—191 X |
| 2,773,601 | 12/1956 | Keller et al. | 210—266 |
| 3,011,643 | 12/1961 | McCoy | 210—289 X |
| 3,039,535 | 6/1962 | Hathorn et al. | 166—228 |

FOREIGN PATENTS 601,370  11/1925  France.

REUBEN FRIEDMAN, *Primary Examiner.*

J. DE CESARE, D. TALBERT, *Assistant Examiners.*